(12) United States Patent
Sauerteig et al.

(10) Patent No.: US 10,811,744 B2
(45) Date of Patent: Oct. 20, 2020

(54) BATTERY CELL, BATTERY MODULE AND PRODUCTION METHOD

(71) Applicant: Robert Bosch GmbH, Stuttgart (DE)

(72) Inventors: Daniel Sauerteig, Bamberg (DE); Silvan Poller, Neisseaue Ot Kaltwasser (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 15/651,262

(22) Filed: Jul. 17, 2017

(65) Prior Publication Data

US 2018/0026294 A1 Jan. 25, 2018

(30) Foreign Application Priority Data

Jul. 19, 2016 (DE) .......... 10 2016 213 142

(51) Int. Cl.
| | |
|---|---|
| *H01M 10/6557* | (2014.01) |
| *H01M 10/647* | (2014.01) |
| *H01M 10/6561* | (2014.01) |
| *H01M 2/20* | (2006.01) |
| *H01M 10/613* | (2014.01) |
| *H01M 10/625* | (2014.01) |
| *H01M 10/6555* | (2014.01) |
| *H01M 10/04* | (2006.01) |

(52) U.S. Cl.
CPC ....... *H01M 10/6557* (2015.04); *H01M 2/206* (2013.01); *H01M 10/613* (2015.04); *H01M 10/625* (2015.04); *H01M 10/647* (2015.04); *H01M 10/6555* (2015.04); *H01M 10/6561* (2015.04); *H01M 10/0413* (2013.01)

(58) Field of Classification Search
CPC ............. H01M 10/0481; H01M 10/05; H01M 10/0413; H01M 2/266; H01M 2/263; H01M 10/60; H01M 10/613; H01M 10/617; H01M 10/647; H01M 10/65; H01M 10/653; H01M 10/655; H01M 10/6551; H01M 10/6554; H01M 10/6555; H01M 10/6556; H01M 10/6557; H01M 10/6566; H01M 2/206; H01M 10/625; H01M 10/6561
USPC ....................................... 429/120
See application file for complete search history.

(56) References Cited

U.S. PATENT DOCUMENTS

2001/0007728 A1* 7/2001 Ogata ................. H01M 2/0245
429/120
2011/0274956 A1 11/2011 Lin et al.
(Continued)

FOREIGN PATENT DOCUMENTS

| DE | 102013018397 | 5/2015 |
|---|---|---|
| DE | 102013020942 | 6/2015 |
| KR | 20140039350 | 4/2014 |

*Primary Examiner* — Gregg Cantelmo
(74) *Attorney, Agent, or Firm* — Michael Best & Friedrich LLP

(57) ABSTRACT

A battery cell (2) with a film cover (4) for electrochemically active material, wherein the film cover (4) is present substantially in a prismatic shape, and therefore the film cover (4) can be assigned two mutually opposite main surfaces (6*a, b*), and with current collectors (10*a, b*) which electrically contact the electrochemically active material and serve for the interconnection of the battery cell (2). At least one current collector (10*a, b*) has a flat element (12*a, b*) which substantially covers a main surface (6*a, b*) of the film cover (4) and has a connection region for connection to a cooling device, or is provided with cooling ducts.

7 Claims, 4 Drawing Sheets

(56) References Cited

U.S. PATENT DOCUMENTS

| | | | |
|---|---|---|---|
| 2012/0298433 A1* | 11/2012 | Ohkura | H01M 2/1077 180/65.1 |
| 2012/0301771 A1* | 11/2012 | Moser | H01M 10/625 429/120 |
| 2014/0057145 A1* | 2/2014 | Goldstein | H01M 2/0207 429/71 |
| 2014/0227576 A1* | 8/2014 | Meintschel | H01M 2/024 429/120 |
| 2016/0322673 A1 | 11/2016 | Meintschel et al. | |

* cited by examiner

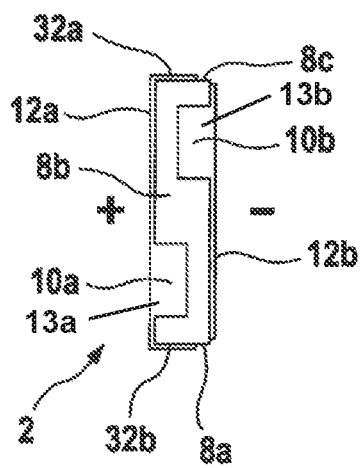
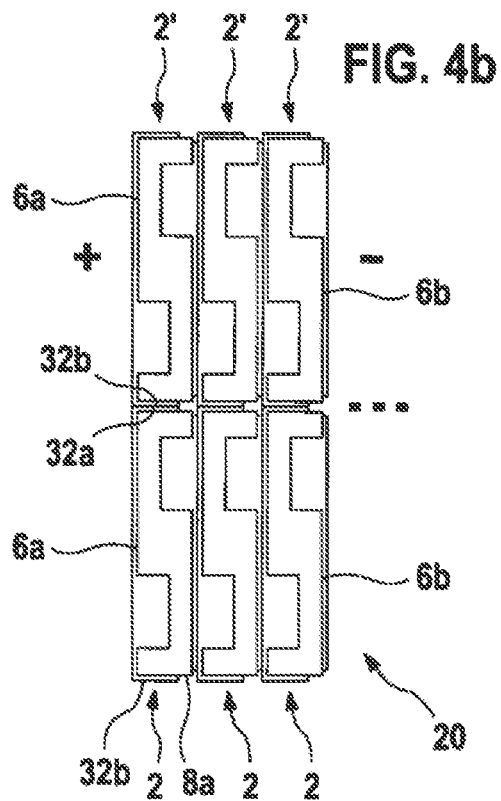
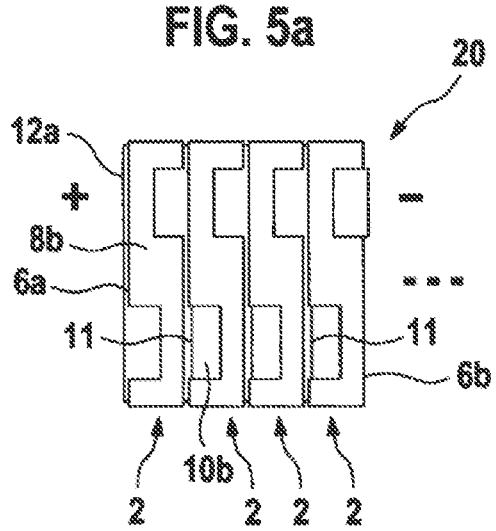
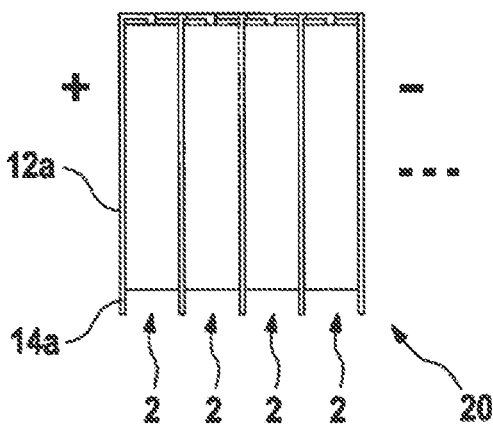

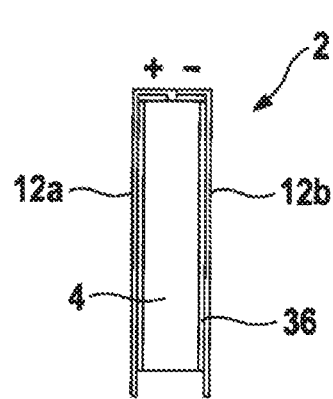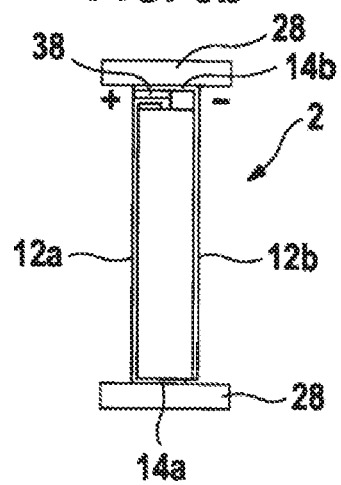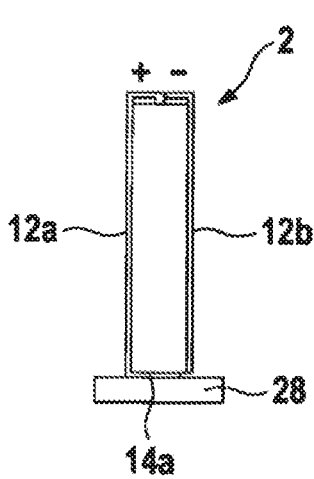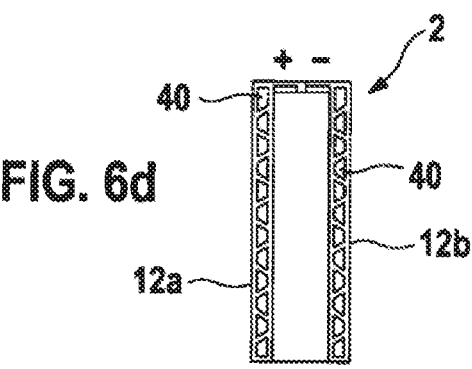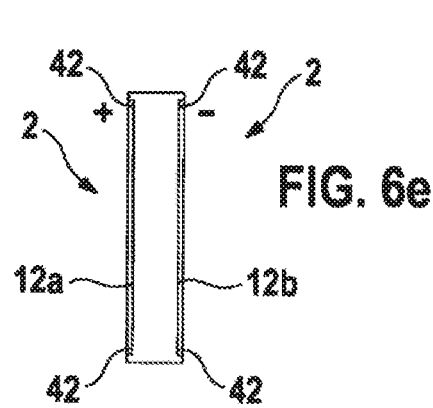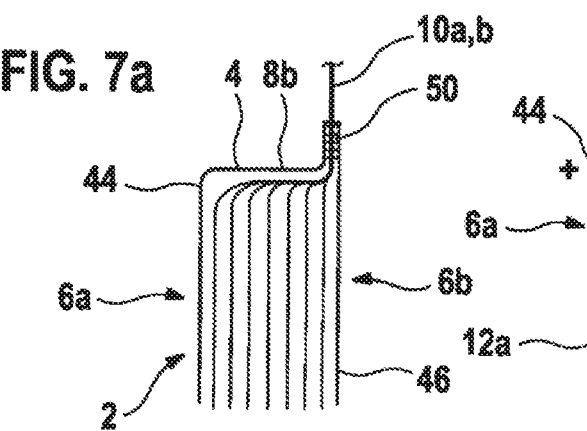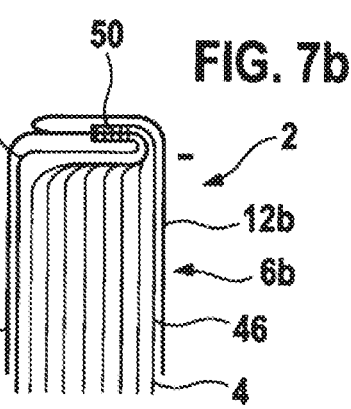

BATTERY CELL, BATTERY MODULE AND PRODUCTION METHOD

BACKGROUND OF THE INVENTION

The invention relates to a battery cell with a film cover for electrochemically active material. The invention also relates to battery modules with battery cells of this type and to a method for producing such a battery cell.

Battery cells with film covers, which are manufactured from a soft material, for the electrochemically active material, which battery cells are also referred to as pouch cells, are known in the prior art. The pouch cells typically have current collectors which electrically contact the electrochemically active material in the interior of the cover and are led out of the cell as lugs. Said lugs which are also called terminals serve for the interconnection of the battery cell to further battery cells in a parallel or series connection.

US 2011/0274956 A1, for example, discloses a battery cell which is designed as a pouch cell, wherein the current collectors not only project out of the cell, but are bent over and beyond the main surfaces of the cell.

KR 2014 0039350 discloses a further pouch cell, wherein the terminals are connected to a cooling device.

Essential properties in the development of new battery cells are the volumetric energy density in watt hours per liter and the cost per kilowatt hour. From this aspect, new cell concepts have to be developed which make optimum use of the electrochemical volume actually used within the cell, save on components and reduce the outlay on production and therefore the costs.

SUMMARY OF THE INVENTION

It is therefore an object of the invention to provide a cell which makes ideal use of the provided volume in the battery system and permits a parallel or series circuit with a low working volume and outlay on costs.

It is proposed that the film cover of the battery cell according to the invention is present substantially in a prismatic shape, and therefore the film cover can be assigned two mutually opposite main surfaces, and that the battery cell has current collectors which electrically contact the electrochemically active material and serve for the interconnection of the battery cell, wherein at least one current collector has a flat element which substantially covers a main surface of the film cover, wherein the flat element has a connection region for connection to a cooling device, or is provided with cooling ducts.

The battery cell can be both a primary battery cell and a secondary battery cell which is configured to store electrical energy and to convert chemical reaction energy into electrical energy and vice versa. Secondary battery cells are also referred to as accumulator cells. In particular, the battery cell can be what is referred to as a lithium ion cell which is typically distinguished by particularly high energy density, thermal stability and low self discharge. One intended use for the provided battery cell can be in particular in motor vehicles, such as electric vehicles, hybrid vehicles and plug in hybrid vehicles.

The electrochemically active material is located within the film cover and is assigned two electrodes, namely a positive electrode which is also referred to as the cathode, and a negative electrode which is also referred to as the anode. The cathode and the anode each comprise a current collector to which the electrochemically active material is applied. During the electrochemical reaction of the discharging operation, electrons flow in an outer current circuit from the anode to the cathode. Within the battery cell, the lithium ions migrate from the anode to the cathode. By contrast, during the charging operation, the lithium ions migrate from the cathode to the anode.

The active material for the cathode can be, for example, a metal oxide. The active material for the anode can be, for example, graphite or silicon.

The electrodes of the battery cell can be designed, for example, in the manner of films and are surrounded by a liquid electrolyte with intermediate layers of a separator. The electrolyte is conductive for the lithium ions and permits the transport of the lithium ions between the two electrodes.

The film cover is manufactured from a soft and/or flexible material, and therefore the battery cell can also be referred to as a pouch cell. An example of a suitable material for the film cover is an aluminum and plastic composite film. The latter is composed of an aluminum layer with a thickness of 10 to 100 μm, preferably of 30 to 80 μm, and one or more plastics layers which can be manufactured, for example, from polypropylene. The plastics layer permits the integrally bonded connection of a plurality of film elements by a thermal process, such as, for example, heat sealing. The overall thickness of the film cover is from 50 to 500 μm, preferably from 100 to 300 μm. The advantages of this film cover reside in the desired shapability, the low complexity of the joining and closure process by, for example, heat sealing, and in the thin configuration of the cell housing.

Although the film cover is manufactured from a soft and/or flexible material, it is present substantially in a prismatic shape, i.e. it has six sides, wherein two of the six side form main surfaces and four of the six sides form secondary surfaces. "Substantially" refers to the fact that the corners and edges may also be rounded here.

The current collector has a flat element which substantially covers a main surface of the film cover, i.e., for example, more than 50%, preferably more than 60%, more than 70%, more than 80%, more than 90%, more than 95% and particularly preferably more than 99%. The covering of the main surface of the film cover with the flat element of the current collector is selected to the effect that the active cooling of the film cover via the current collectors can be achieved to the desired extent.

An example of a cooling device is a cooling plate which can be, for example, of solid design or else can have cooling ducts with a heat transport medium. An air flow or gas flow can also be referred to as the cooling device, wherein the connection region is then designed in such a manner that it is exposed to the air flow or gas flow.

According to a preferred embodiment, the connection region of the current collector for the connection to the cooling device at least partially covers at least one secondary surface of the film cover. The current collector can therefore be configured in cross section, for example, as an L profile or as a U profile. Alternatively, it can be provided that the connection region of the current collector protrudes perpendicularly with respect to the secondary surface of the film cover.

According to a further preferred embodiment, an adhesive element is arranged between the film cover and the current collector in the region of the main surface for absorbing volume. The adhesive element between the current collector and the pouch film preferably has good heat conductivity of between 0.15 and 10 W/(mK), and therefore the pouch cell is cooled via the current collectors. For absorbing volume, the adhesive element has an adapted modulus of elasticity or is designed as a functional polymer with an adaptable modulus of elasticity. In combination with a corresponding module concept, the expansions of the cells can be compensated for by this embodiment in order thereby to be able to adjust the increase in force over the service life of the cells.

According to a further preferred embodiment, the connection region of the current collector is surrounded with electrical insulation. Use can advantageously be made here of an electrically conductive cooling plate as the cooling device, with the short circuiting of the cells being prevented.

The current collectors can be led out of the film cover on the same side or on an opposite side.

According to an embodiment of the invention, the two current collectors each have flat elements, and therefore they each substantially cover a main surface of the film cover. It is provided here that the two current collectors each substantially cover a different main surface of the film cover and each have a connection region for connection to a cooling device or are provided with cooling ducts.

For example, metal sheets of a thickness of 0.1 to approximately 0.5 mm can be used as the flat elements, wherein copper, copper/nickel or iron/nickel (e.g. Hilumin) are preferably appropriate on the negative side and aluminum on the positive side. The flat elements can be surface coated in order, for example, to improve transient resistances and durability with respect to protection against corrosion. Examples thereof are galvanic nickel, tin or chromium coatings.

The battery cells can be interconnected to form modules, wherein two or more battery cells designed in such a manner are interconnected in parallel and/or serially in order to provide the required power and energy.

According to an embodiment of the invention, a battery module comprises at least two battery cells which are designed as described, wherein the battery cells are pressed against one another with main surfaces with opposing poles in each case for the series connection.

In particular, the battery cells here can be configured in such a manner that in each case two current collectors each substantially cover the main surfaces of the film cover.

As an alternative thereto, a battery module according to the invention can comprise at least one first battery cell designed in such a manner and a further battery cell, wherein the further battery cell likewise has a film cover for the electrochemically active material, wherein the film cover is likewise present in a prismatic shape, and therefore the film cover can be assigned two mutually opposite main surfaces, wherein the further battery cell likewise has current collectors which electrically contact the electrochemically active material and serve for the interconnection of the battery cell, wherein the current collector which has the flat element which substantially covers a main surface of the film cover and has a connection region for connection to a cooling device or is provided with cooling ducts, also substantially covers a main surface of the film cover of the further battery cell and is connected to a current collector of the further battery cell.

In this embodiment, the battery cells divide a flat current collector, wherein the current collector which covers the two main surfaces is formed as a single piece. The connection to the further current collector of the further battery cell takes place, for example, in an integrally bonded manner.

In the case of a parallel connection, with such an arrangement of the two battery cells, the current collector which substantially covers the main surfaces of the film covers of the two battery cells has the same polarity as the connected current collector of the further battery cell. In the case of a series connection of the two battery cells, with such an arrangement, the current collector which substantially the covers the main surfaces of the two film covers of the two battery cells has a different polarity than the connected current collector of the further battery cell.

A method according to the invention for producing such a battery cell preferably comprises the steps
  a) providing second film cover parts either in the form of two half shells or in the form of a first half shell and a covering film, which surround the electrochemically active material, wherein the first half shell forms a main surface of the film cover, and wherein the current collectors protrude from a secondary surface,
  b) peripherally thermally sealing the two film cover parts,
  c) bending over the current collectors such that the current collectors nest against the secondary surface, and
  d) further bending over of at least one current collector such that a flat element of the current collector covers the main surface, or integrally bonded connecting of the current collector to a component which forms a flat element which covers the main surface.

While conventional pouch cells can be difficult to cool since the heat conductivity perpendicularly through the pouch film is much poorer than in metal materials, in the case of the presented application of the cooling system to the current collectors, the pouch is cooled fully or over a partial area. In addition, the electrodes in the interior of the cell are cooled directly via the current collectors. The presented cell configuration therefore permits cooling of the surfaces and at the same time cooling of the collectors.

The position of the leadthrough of the collectors is in principle variable, and therefore the lugs can be led through on the same side or on opposite sides.

In addition, the volume is made use of to an optimized extent by the presented production concept with a fold in the collector region.

In contrast to the prior art, the interconnection of a plurality of cells is also simplified by surface contact and the cooling properties of the battery module are significantly improved.

While conventional pouch cells require a considerable outlay for the interconnection of the cells to form modules since the current collectors according to the prior art are connected in an integrally bonded manner to one another, the battery cell according to the invention compensates for these disadvantages by means of a current collector which permits the cells to be interconnected by means of surface contact.

In addition, the pouch cell is distinguished by a simple construction since few components are used, which permits low costs and a flexible geometry.

The cell can in principle be produced with manufacturing plants which already exist since no additional complicated method steps for the production have to be included.

Diverse sensor and current connecting elements are possible, for example force fitting contact elements can be, for example, oversprung or else integrally bonded contact elements can be provided with the cell supervision circuit (CSC).

The contact element for the surface contact can serve as electrode of a pressure sensor, and the counter electrode can be realized by the pouch film. The sensor signal can be used here, for example, for active pressure regulation in the module in order to determine the state of charge (SOC) or state of health (SOH).

BRIEF DESCRIPTION OF THE DRAWINGS

The invention is illustrated in more detail below with reference to the drawings, wherein the latter should merely be understood as being illustrative and do not restrict the invention.

FIG. 4a shows a top view of a battery cell according to a further embodiment of the invention, FIG. 4b shows a top view of a battery module with a plurality of battery cells according to FIG. 4, FIG. 5a shows a top view of a battery module with a plurality of battery cells according to a further embodiment of the invention, FIG. 5b shows a lateral sectional view through the battery module from FIG. 5a, FIGS. 6a through 6e show further embodiments of the battery cell in lateral top views of the secondary surface, and FIGS. 7a and 7b show cutouts of details of a battery cell according to a further embodiment of the invention during a production process.

In the figures, similar or identical features are illustrated with similar or identical reference signs. A repeated description is omitted in individual cases.

DETAILED DESCRIPTION

Figure 1:
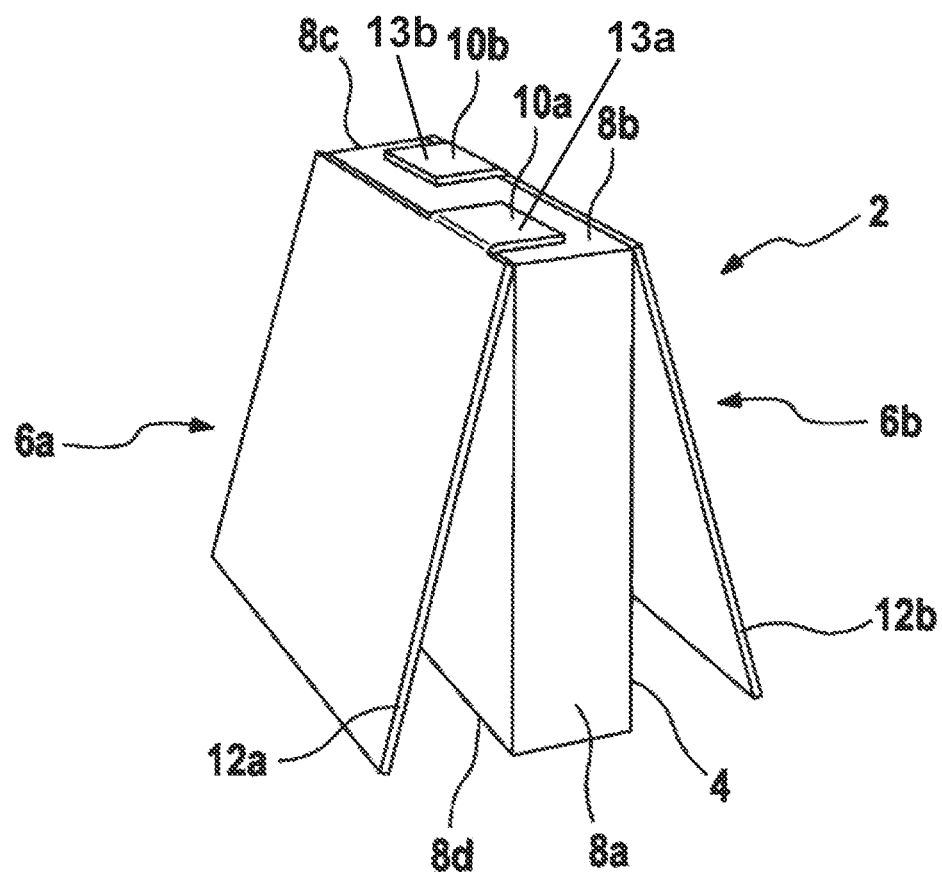
FIG. 1 shows a perspective view of a battery cell according to the invention according to an embodiment of the invention.

FIG. 1 shows a battery cell 2 according to a first embodiment of the invention. The battery cell 2 comprises a film cover 4 which is manufactured from a soft material, and therefore the battery cell 2 can also be referred to as a pouch cell. The film cover 4 has a substantially prismatic shape, and therefore it can be assigned two main surfaces 6a, b, and four secondary surfaces 8a, 8b, 8c, 8d.

In addition, the battery cell 2 comprises two current collectors 10a, b which are led out of the film cover 4 on a secondary surface 8b. Instead of leading the current collectors 10a, b perpendicularly out of the film cover 4, they are placed flat against the secondary surface 8b, for example as illustrated and described with reference to FIGS. 7a, b.

The current collectors 10a, b have flat elements 12a, b which substantially cover the respective main surface 6a, b of the film cover 4. In FIG. 1, the folding over process illustrated and described with respect to FIGS. 7a, 7b is not completely carried out, and therefore the flat elements 12a, b still protrude somewhat. The term "substantially cover" also includes this state in the present disclosure.

The flat elements 12a, b and the main surfaces 6a, b of the film cover 4 are preferably designed in such a manner that the dimensions substantially correspond, i.e., for example, except for 10% or less, preferably except for 1% or less, wherein connection regions for interconnection to further cells or for connection to cooling devices which are described with respect to the following figures are not taken into consideration in the dimensioning of the surfaces.

Figure 2A:
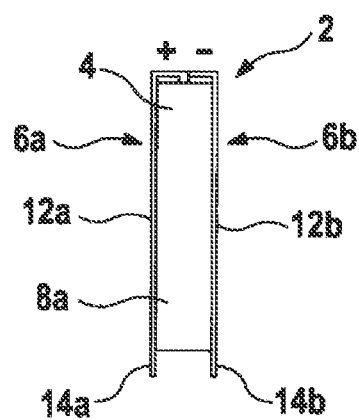
FIG. 2a shows a lateral view of the battery cell from FIG. 1.

FIG. 2a shows the battery cell 2 in a lateral top view of the secondary surface 8a, wherein the flat elements 12a, b are now tightly placed onto the main surfaces 6a, b of the film cover 4 and completely cover same. The flat elements 12a, b protrude slightly below the battery cell 2 and thereby define a connection region 14a, b for a cooling device which is described, for example, with respect to FIG. 2c.

Figure 2B:
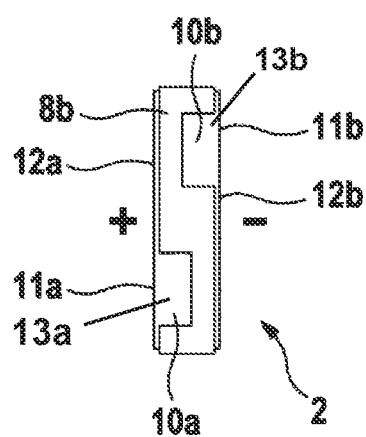
FIG. 2b shows a top view of the battery cell from FIG. 1.

FIG. 2b shows a top view of the battery cell 2 which is illustrated in FIG. 2a and from which it is, for example, clear a portion 13a, b of the current collectors 10a, b are arranged spaced apart from each other on the secondary surface 8b.

Figure 2C:
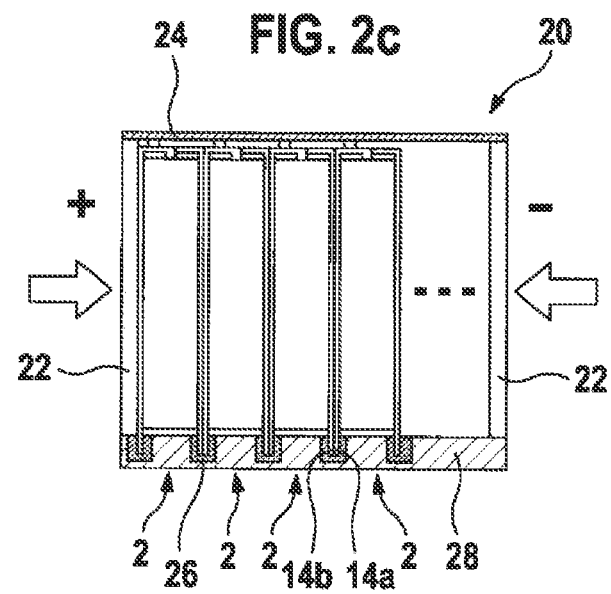
FIG. 2c shows a lateral sectional view through a battery module with a plurality of battery cells from FIG. 1.

FIG. 2c illustrates a battery module 20 which is formed from a plurality of battery cells 2 which can be designed as described with reference to FIG. 2a. Four battery cells 2 which are arranged next to one another and are respectively joined to one another in a flat manner with their main surfaces 6a, b are illustrated. The interconnection of the battery cells 2 can be configured in particular serially, and therefore in each case the flat element 12a, b of a current collector 10a, b of a pole of the one battery cell 2 is connected to the flat element 12a, b of the current collector 10a, b of an opposing pole of the cell located next thereto.

Pressure exerting plates 22 are arranged on the left side and on the right side of the battery module 20 in order to bring about contact between the battery cells 2. In order to produce the surface contact, a corresponding pressure is exerted via the pressure exerting plates 22 and is transmitted as homogeneously as possible via the battery cells 2 of the battery module 20. This achieves the optimum performance and service life of the battery module 20.

The temperature and voltage tap offs in such a configuration can be achieved, as illustrated, on the top side by a cell supervision circuit 24, also referred to as CSC, which is formed, for example, from a flexible material. The CSC can be contacted via an integrally bonded connecting technique or else by oversprung contacting.

FIG. 2c also illustrates the cooling concept for cooling the battery cells 2. The battery cells 2 are thermally connected with their connection region 14a, b to a cooling plate 28. The cooling of the connection regions 14a, b leads, since said connection regions lie flat against the main surfaces 6a, b of the film cover 4 directly via the flat elements 12a, b, to surface cooling of the battery cell 2. In addition, the current collectors 10a, b are electrically and thermally conductively connected directly to the electrode films of the electrode unit in the cell interior. By this means, what is referred to as terminal cooling is realized here. Overall, optimized cooling in comparison to conventional pouch cells is thereby possible. Furthermore, the connection regions 14a, b are surrounded with electrical insulation 26 in order to insulate the flat elements 12a, b from an electrically conductive cooling plate 28.

Figure 3:
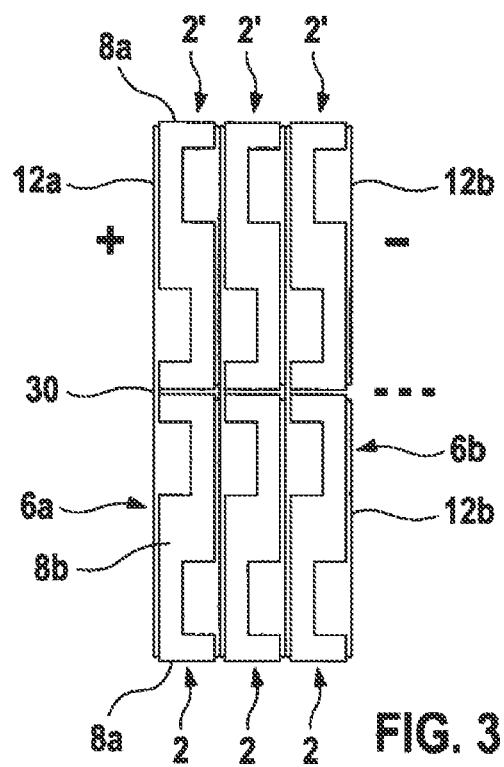
FIG. 3 shows a top view of a battery module with a plurality of battery cells according to a further embodiment of the invention.

FIG. 3 shows a possibility for the parallel interconnection of battery cells 2 according to a further embodiment of the invention. In contrast to the embodiment illustrated and described with respect to FIGS. 1 and 2, a respective pair of battery cells 2' has a common flat element 12a of a current collector 10a. Two battery cells 2 are therefore in each case arranged with their secondary surfaces 8a lying against each other, and therefore their main surfaces 6a form a common surface 30. The common surface 30 is covered via a common surface element 12a of the current collectors 10a. The battery cell pairs 2' can in turn be interconnected serially by arranging them in a row.

FIG. 4a shows, in top view, a battery cell 2 according to a further embodiment of the invention, wherein said battery cell differs with respect to FIGS. 1 and 2a through c in that the current collector 10a is of U shape design and has contacting portions 32a, b which partially cover the secondary surfaces 8a and 8c. This can take place, for example, by the fact that the flat element 12a is folded over laterally.

FIG. 4b shows a top view of a battery module 20 with six battery cells 2 which are configured as described with respect to figure a. According to FIG. 3, two battery cells 2 can in each case be arranged next to each other here butting against each other via their secondary surfaces 8a, and therefore they form battery cell pairs 2' which can be interconnected parallel to one another. The battery cell pairs 2' are mutually in contact via the contacting portions 32a, b.

FIG. 5a shows a further variant for the interconnection of a plurality of battery cells 2 according to a further embodiment of the invention in series, wherein the battery module 20 formed as a result is illustrated in top view. Two battery cells 2 are in each case connected here to a common flat element 12a which is positioned between the battery cells 2. This leads to the electrical contacting of two battery cells 2 in this embodiment not being realized by surface contact, but rather taking place via an integrally bonded connection 11 of a flat element 12a to a current collector 10b. Only one material layer with the flat element 12a is therefore arranged between the battery cells. As illustrated in FIG. 5b, the flat element 12a can in turn have the connection region 14a with which said flat element can be connected to the cooling plate 28, as described with respect to FIG. 2c. In this variant, surface and terminal cooling of the battery cells 2 is therefore realized without the battery cells 2 being electrically connected by means of surface contacting. The embodiment can in turn be combined with the above described variants for parallel interconnection.

FIGS. 6a through 6e illustrate further embodiments of battery cells 2 according to the invention that can be combined with the above described interconnection variants to form corresponding battery modules 20 and with one another.

In FIG. 6a, an adhesive element 36 is arranged between the film cover 4 and the flat element 12b. The adhesive element 36 integrates the function of mechanical stabilization and good conductivity. In order to absorb volume, the adhesive element 36 has an adapted modulus of elasticity for mechanical balancing of the battery module 20. For this purpose, for example, use can be made of a functional polymer with an adaptable modulus of elasticity, to which an adhesive film is applied.

FIGS. 6b and 6c show embodiments in which at least one flat element 12a, b is of L shaped design. As a result, such a battery cell 2 can be temperature controlled by simply being placed onto the flat cooling plate 28, as is known, for example, in the prior art. There is the possibility of designing both flat elements 12a, b in a L shape, which is illustrated in FIG. 6b. This realizes a variant which permits cooling of the battery cell 2 from the upper side and the lower side. In order to prevent electrical contact between the current collectors 10a, b, a further electrical insulating layer 38 is provided here. In FIG. 6c, only one of the flat elements 12a has the L shape in order to provide the contact with the cooling plate 28 in a flat manner.

FIG. 6d shows an embodiment in which the flat elements are formed by a two- or multi layered construction, and therefore air cooling of the battery cell 2 can be realized. The flat elements 12a, b here are provided with cooling ducts 40 which permit a flow of any desired cooling medium, for example an air flow. In addition, in this variant, the flat elements 12a, b can likewise be configured mechanically in such a manner that they bring about mechanical balancing of the module.

FIG. 6e shows yet another embodiment of a battery cell 2, wherein the leadthrough of the current collectors 10a, b through the film cover 4 is omitted. The electrode unit is electrically conductively connected here in the interior of the battery cell 2 directly to the flat elements 12a, b. The latter can replace the pouch film in the flat contact region. This is realized by the fact that the surface elements 12a, b are peripherally sealed with the pouch film. The sealing is illustrated here by sealing points 42. This gives rise to a pouch cell with a mechanical contact window as the flat element 12a, b. By means of this variant, further volume for the external contacting of the battery cells 2 for interconnection as a battery module 20 and for the leadthrough of the current collectors 10a, b can be saved.

FIGS. 7a and 7b show a folding concept in the region of the leadthrough of the current collectors through the film cover 4.

The film cover 4 of the battery cell 2 comprises a thermoformed pouch film which forms a first half shell 44, and a flat covering film 46. The films surround the active material and are connected to each other at a peripheral fold 50 by thermal sealing. Alternatively, a variant is possible in which the two pouch films are present as half shells 44. On the side of the leadthrough of the current collectors 10a, b, the fold 50 and the current collectors 10a, b are placed against the secondary surface 8b of the battery cell 2 by folding over through 90°. A current collector 10a is subsequently placed against the main surface 6a by further folding over through 90°. The other current collector 10b of the opposing pole has to be folded over through 180° in order subsequently to be placed against the opposite large main surface 6b by further folding over through 90°, as illustrated in FIG. 7b. By means of very thin sheet metal thicknesses of the current collectors 10a, b of a maximum of 0.5 mm, these bends can be realized with little effort and with a small bending region with small radii.

The invention is not restricted to the exemplary embodiments described here and to the aspects emphasized therein. On the contrary, a multiplicity of modifications which lie within the scope of expert action are possible within the range indicated by the claims.

What is claimed is:

1. A battery module comprising two battery cells (2), wherein each battery cell (2) comprises
an anode;
a cathode;
a liquid electrolyte surrounding the anode and cathode;
a flexible film cover (4) for electrochemically active material, wherein the film cover (4) is substantially in a prismatic shape and has two mutually opposite main surfaces (6a, b), and
two current collectors (10a, b), one of which electrically contacts the anode and another of which electrically contacts the cathode, wherein each of the current collectors is configured to connect with a like current collector of an adjacent battery cell, wherein the current collectors each include a first portion (12a, b) and a second portion (13a, b) formed as a single piece, the first portion being perpendicular to the second portion, wherein the first portion is a flat element which substantially covers one of the main surfaces (6a, b) of the film cover (4) and which is configured to abut the like current collector of the adjacent battery cell, wherein the first portion (12a, b) is provided with cooling ducts (40), and wherein the second portion is in contact with a secondary surface of the film cover;

wherein the two battery cells (2) are pressed against each other with main surfaces (6a, b) with opposing poles in each case for series connection.

2. The battery module according to claim 1, characterized in that for each battery cell (2) an adhesive element (36) is arranged between the film cover (4) and one of the current collectors (10a, b) in the region of one of the main surfaces (6a, b) for absorbing volume.

3. The battery module according to claim 1, characterized in that for each battery cell (2), the current collectors (10a, b) are led out of the film cover (4) on the same side or on an opposite side.

4. The battery module according to claim 1, wherein for each battery cell (2), each first portion includes two opposed parallel surfaces perpendicular to the corresponding second portion of each of the current collectors, wherein the cooling ducts are positioned between the parallel surfaces, and wherein the second portion has a first surface in contact with a secondary surface of the film cover.

5. The battery module according to claim 1, wherein for each battery cell (2), the second portion of each current collector is formed as a tab extending from only a portion of an edge of the first portion of the current collector, such that the second portion of each current collector is positioned on one half of the secondary surface of the film cover, and wherein the second portion of each current collector contacts an electrode of the battery cell.

6. A method for producing each of the battery cells in the battery module according to claim 1, the method comprising
providing two film cover parts either in the form of two half shells (44) or in the form of a first half shell (44) and a covering film (4b), which surround the electrochemically active material, wherein the first half shell (44) forms a main surface (6a, b) of the film cover (4), and wherein the current collectors (10a, b) protrude from a secondary surface (8a, b),
peripherally thermally sealing the two film cover parts,
bending over of the current collectors (10a, b) such that the current collectors (10a, 10b) nest against the secondary surface (8a, b), and
further bending over of the current collectors (10a, b) such that a flat element (12a, b) of the current collector (10a, b) covers the main surface (6a, b), or integrally bonded connecting of the current collector (10a, b) to a component which forms a flat element (12a, b) which covers the main surface (6a, b).

7. A battery module comprising:
first and second battery cells (2) each comprising an anode, a cathode, a liquid electrolyte surrounding the anode and cathode, a flexible film cover (4) for electrochemically active material, wherein the film cover (4) is substantially in a prismatic shape and has two mutually opposite, substantially planar, substantially parallel main surfaces (6a, b), and two current collectors (10a, b), one of which electrically contacts the anode and an other of which electrically contacts the cathode, wherein each of the current collectors is configured to connect with a like current collector of an adjacent battery cell, wherein the current collectors each include a first portion (12a, b) and a second portion (13a, b) formed as a single piece, the first portion being perpendicular to the second portion, wherein the first portion is a flat element which substantially covers one of the main surfaces (6a, b) of the film cover (4), and which has mutually opposite, substantially planar, substantially parallel surfaces that are substantially parallel to the main surfaces (6a, b), wherein one of the substantially parallel surfaces is configured to abut one of the substantially parallel surfaces of the flat element of the like current collector of the adjacent battery cell, wherein the first portion (12a, b) is provided with cooling ducts (40), and wherein the second portion is in contact with a secondary surface of the film cover,
wherein the first battery cell is adjacent the second battery cell and one of the substantially parallel surfaces of the flat element of one of the current collectors of the first battery cell connects with, abuts and is parallel to one of the substantially parallel surfaces of the flat element of one of the current collectors of the second battery cell.

* * * * *